(12) United States Patent
Hoeber et al.

(10) Patent No.: US 10,605,939 B2
(45) Date of Patent: Mar. 31, 2020

(54) MULTI-VINTAGE ENERGY MAPPING

(71) Applicant: CGG SERVICES SAS, Massy (FR)

(72) Inventors: Henning Hoeber, East Grinstead (GB); Adel Khalil, Aberdeen (GB)

(73) Assignee: CGG SERVICES SAS, Massy (FR)

(*) Notice: Subject to any disclaimer, the term of this patent is extended or adjusted under 35 U.S.C. 154(b) by 345 days.

(21) Appl. No.: 15/521,331

(22) PCT Filed: Oct. 26, 2015

(86) PCT No.: PCT/IB2015/002436
§ 371 (c)(1),
(2) Date: Apr. 24, 2017

(87) PCT Pub. No.: WO2016/067111
PCT Pub. Date: May 6, 2016

(65) Prior Publication Data
US 2017/0307773 A1    Oct. 26, 2017

Related U.S. Application Data

(60) Provisional application No. 62/068,844, filed on Oct. 27, 2014.

(51) Int. Cl.
*G01V 1/30* (2006.01)
(52) U.S. Cl.
CPC .......... *G01V 1/308* (2013.01); *G01V 2210/61* (2013.01); *G01V 2210/612* (2013.01)

(58) Field of Classification Search
CPC ............. G01V 1/308; G01V 2210/612; G01V 2210/61
See application file for complete search history.

(56) References Cited

U.S. PATENT DOCUMENTS

| | | |
|---|---|---|
| 6,549,854 B1 | 4/2003 | Malinverno et al. |
| 8,339,898 B2 | 12/2012 | Smith et al. |
| 2006/0235620 A1 | 10/2006 | Lecerf |

(Continued)

OTHER PUBLICATIONS

International Search Report, dated Mar. 18, 2016, from corresponding PCT application No. PCT/IB2015/002436.

(Continued)

*Primary Examiner* — Stephanie E Bloss
(74) *Attorney, Agent, or Firm* — Patent Portfolio Builders PLLC (57) ABSTRACT

Multi-vintage energy mapping selects a first seismic survey data and a second seismic survey dataset from a plurality of seismic survey datasets. The first seismic survey dataset includes a set of first energies associated with a first seismic survey geometry, and the second seismic survey dataset includes a set of second energies associated with a second seismic survey geometry. The first set of energies are mapped from the first seismic survey geometry to the second seismic survey geometry, and the second set of energies are mapped from the second seismic survey geometry to the first seismic survey geometry. An updated first seismic dataset and an updated second seismic dataset are generated such that only energies from the first and second seismic datasets associated with changes in a subsurface are preserved in the updated first and second seismic datasets.

20 Claims, 3 Drawing Sheets

(56) References Cited

U.S. PATENT DOCUMENTS

| | | | | |
|---|---|---|---|---|
| 2010/0161230 A1* | 6/2010 | Chu | ........................ | G01V 1/32 |
| | | | | 702/14 |
| 2012/0014217 A1* | 1/2012 | Houck | ................... | G01V 1/282 |
| | | | | 367/72 |
| 2013/0253838 A1* | 9/2013 | Tegtmeier-Last | ........ | G01V 1/32 |
| | | | | 702/17 |
| 2013/0289879 A1* | 10/2013 | Grandi | ..................... | G01V 1/30 |
| | | | | 702/6 |
| 2013/0289960 A1* | 10/2013 | Grandi | .................. | G01V 1/308 |
| | | | | 703/10 |
| 2016/0146965 A1* | 5/2016 | Nguyen | ................... | G01V 1/40 |
| | | | | 702/6 |
| 2016/0327672 A1* | 11/2016 | Lacombe | ................ | G01V 1/366 |
| 2017/0205522 A1* | 7/2017 | Thore | .................... | G01V 1/308 |
| 2017/0285196 A1* | 10/2017 | Zhang | ..................... | G01V 1/38 |

OTHER PUBLICATIONS

Rodney Calvert, "4D technology: where are we, and where are we going?", Geophysical Prospecting, 2005, pp. 161-171, vol. 53.

Gordon Poole et al., "Effect of regularization in the migration of time-lapse data", First Break, Apr. 2006, pp. 25-31, vol. 24, No. 4.

Sheng Xu et al., "Seismic Data Regularization with Anti-Leakage Fourier Transform", EAGE 66th Conference & Exhibition, Jun. 7-10, 2004, pp. 1-4.

Yu Zhang et al. "True amplitude wave equation migration arising from true amplitude one way equations", Inverse Problems, Sep. 5, 2003, vol. 19, No. 5, Abstract only.

\* cited by examiner

MULTI-VINTAGE ENERGY MAPPING

CROSS REFERENCE TO RELATED APPLICATIONS

The present application is a National Stage of PCT Application No. PCT/IB2015/002436, filed Oct. 26, 2015, which claims priority and benefit from U.S. Provisional Patent Application No. 62/068,844, filed Oct. 27, 2014, for "Multi-Vintage Energy Mapping", the entire contents of which is incorporated herein by reference.

TECHNICAL FIELD

Embodiments of the subject matter disclosed herein generally relate to methods and systems for simultaneous processing of multiple seismic datasets.

BACKGROUND

In the seismic processing industry, it is often required to simultaneously process multiple datasets at a time. In a time-lapse context, the main interest is measuring changes in the subsurface conditions to guide infill well drilling and maximize oil and gas production. Often between seismic datasets from any two seismic survey vintages, source and receiver positions are not the same. The seismic survey vintages may be several years apart, and the survey methods used for each vintage may be different. For example one vintage is from a Towed Streamer (TS) seismic survey, and the other vintage is from an Ocean Bottom Cable (OBC) seismic survey. Changes in time and survey methods result in different seismic data acquiring geometries and parameters that can mask the true changes in the subsurface, i.e., the 4D signal, if taken into account when processing the seismic data from multiple vintages.

Previous attempts to compensate for these differences in acquiring geometries and parameters applied a seismic processing sequence that matched seismic datasets from different vintages such that only real subsurface changes were preserved. The seismic processing sequence included 4D binning (e.g. Calvert, 2005), regularization (e.g. Poole and Lecerf, 2006) and migration (e.g. Zhang et al., 2003). These three steps minimized acquisition induced differences (4D noise) while retaining the real 4D signal.

In the 4D binning process, traces are paired from different datasets according to the geometrical differences and possibly other criteria such as normalized root mean square (NRMS) to define a measure of repeatability. Traces with low metric values are dropped. While this approach improves the overall repeatability, the resolution and signal-to-noise ratio are reduced. All seismic datasets are then regularized and imaged independently to the same reference geometry where further processing can be performed. Regularization and migration operators, however, are not perfect and are affected by the geometrical characteristics of the datasets being processed. As these two steps are performed in a dataset independent manner, the geometrically induced imprint is left on the datasets. This can lead to suboptimal results in the differencing process with residual noise potentially masking the 4D signal.

The need still exists, however, for a more accurate determination of changes in the actual traces between two vintages of seismic datasets that compensates for changes in acquisition parameters and acquisition geometries between the two vintages.

SUMMARY OF THE INVENTION

Exemplary embodiments are directed to systems and methods that use a framework for improved regularization and imaging. The binning process is dropped, and all traces in the seismic datasets between vintages are used unlike in standard 4D binning. The framework uses processes that downweight traces that do not contribute to the 4D signal. However, the framework is not limited to these processes, but is a general concept that is applied to any data or energy mapping technique where multiple datasets with different acquisition geometries are to be processed simultaneously.

In accordance with one exemplary embodiment for a method for multi-vintage energy mapping, a first seismic survey dataset and a second seismic survey dataset are selected from a plurality of seismic survey datasets. The first seismic survey dataset contains a set of first energies associated with a first seismic survey geometry, and the second seismic survey dataset contains a set of second energies associated with a second seismic survey geometry. The first set of energies are mapped from the first seismic survey geometry to the second seismic survey geometry, and the second set of energies are mapped from the second seismic geometry to the first seismic survey geometry. An updated first seismic survey dataset and an updated second seismic survey dataset are generated such that only energies from the first and second seismic survey datasets associated with changes in a subsurface are preserved in the updated first and second seismic survey datasets.

In one embodiment, the first seismic survey dataset and the second seismic survey dataset were obtained at different times, and physical locations at which energies in the first set of energies and the second set of energies were obtained vary. In one embodiment, a plurality of pairs of first and second seismic survey datasets is selected from the plurality of seismic survey datasets. Each first seismic survey dataset includes the set of first energies associated with the first seismic survey geometry, and each second seismic survey dataset includes the set of second energies associated with the second seismic survey geometry. The first set of energies are mapped from each first seismic survey geometry in a given pair to the second seismic survey geometry of that given pair, and the second set of energies are mapped from each second seismic survey geometry in a given pair to the first seismic survey geometry of that given pair. The updated first seismic survey dataset and the updated second seismic survey dataset are generated for each pair.

In one embodiment, the first set of energies includes a plurality of first seismic traces, and the second set of energies includes a plurality of second seismic traces. Mapping the first set of energies includes interpolating the plurality of first seismic traces from the first seismic survey geometry to the second seismic survey geometry, and mapping the second set of energies includes interpolating the plurality of second seismic traces from the second seismic survey geometry to the first seismic survey geometry.

In one embodiment, the first set of energies is mapped from the second seismic survey geometry to a secondary first seismic survey regular grid, and the second set of energies is mapped from the first seismic survey geometry to a secondary second seismic survey regular grid. In one embodiment, the secondary first seismic survey regular grid and the secondary second seismic survey regular grid are identical regular grids.

In one embodiment, the first set of energies is mapped from the first seismic survey geometry to a primary first seismic survey regular grid, and the second set of energies is mapped from the second seismic survey geometry to a primary second seismic survey regular grid. In one embodiment, the primary first seismic survey regular grid and the primary second seismic survey regular grid are identical regular grids. In one embodiment, the first set of energies is mapped from the primary first seismic survey regular grid to the second seismic survey geometry, and the second set of energies is mapped from the primary second seismic survey regular grid to the first seismic survey geometry.

Exemplary embodiments are also directed to a computer-readable medium containing computer-executable code that when read by a computer causes the computer to perform a method for multi-vintage energy mapping in which a first seismic survey dataset and a second seismic survey dataset are selected from a plurality of seismic survey datasets. The first seismic survey dataset contains a set of first energies associated with a first seismic survey geometry, and the second seismic survey dataset contains a set of second energies associated with a second seismic survey geometry. The first set of energies are mapped from the first seismic survey geometry to the second seismic survey geometry, and the second set of energies are mapped from the second seismic geometry to the first seismic survey geometry. An updated first seismic survey dataset and an updated second seismic survey dataset are generated such that only energies from the first and second seismic survey datasets associated with changes in a subsurface are preserved in the updated first and second seismic survey datasets.

An exemplary embodiment is directed to a computing system for performing a method multi-vintage energy mapping. This computing system includes a storage device comprising a plurality of seismic survey datasets and a processor in communication with the storage device. The processor is configured to select a first seismic survey dataset and a second seismic survey dataset from the plurality of seismic survey datasets. The first seismic survey dataset includes a set of first energies associated with a first seismic survey geometry, and the second seismic survey dataset includes a set of second energies associated with a second seismic survey geometry.

The processor is also configured to map the first set of energies from the first seismic survey geometry to the second seismic survey geometry, map the second set of energies from the second seismic survey geometry to the first seismic survey geometry and generate an updated first seismic dataset and an updated second seismic dataset, wherein only energies from the first and second seismic datasets associated with changes in a subsurface are preserved in the updated first and second seismic datasets.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary embodiments of systems and methods cross-map energies from two vintages of seismic data between locations associated with those two vintages of seismic data. Any energy mapping process, for example, regularization or migration, can be conceptually defined in terms of a minimization problem.

$$E = \|d - Lm\| \tag{1}$$

where E is the cost function to be minimized, d is the input data, L is the geometry dependent un-mapping operator, and m is the mapped model, i.e., the solution.

In the regularization process, the energy un-mapping operator L corresponds to the de-regularization operator. Therefore, the energy un-mapping operator L maps back the regularized data m to the original recording geometry where the data d have been recorded. If the energy mapping operation is defined within an imaging context, L corresponds to the de-migration operator, i.e., L propagates back the imaged data m to the original recording geometry. All energy mapping techniques have a similar correspondence.

The minimization process does not have to be explicitly defined as in Equation (1) but can be implemented within an implicit scheme similar but not limited to the anti-leakage Fourier reconstruction method described in "Seismic Data Regularization With Antileakage Fourier Transform" by Xu and Pham, 66th Ann. Intl. Mtg., EAGE, Expanded Abstracts (2004).

Typically, Equation (1) is minimized for each dataset independently, where a cost function is implicitly or explicitly defined for each vintage. For example, equations for two seismic datasets, i.e., two vintages, are provided as follows:

$$E_1 = \|d_1 - L_1 m_1\|, E_2 = \|d_2 - L_2 m_2\| \tag{2}$$

where the subscripts 1 and 2 refer to the first and second seismic datasets, i.e., the first and second vintages, respectively.

Inter-vintage coupling terms are applied to map energies between the geometries associated with two vintages of seismic data. In one embodiment, a single inter-vintage coupling term is used. Alternatively, a plurality of inter-vintage coupling terms, for example two or more, is used. In one embodiment, an inter-vintage coupling term is introduced that preserves the sum or the difference between the two seismic datasets when the energy mapping process is applied and de-applied for different geometries. This insures that the imprint of the mapping operation is not introduced into the solution. One inter-vintage coupling term for two vintages is:

$$E_{12}^{\pm}=\|L_1^H L_1(m_1 \pm m_2) - L_2^H L_2(m_1 \pm m_2)\| \quad (3)$$

where $L_1^H$ and $L_2^H$ are the geometry dependent energy mapping operators for the first and the second datasets respectively. The energy mapping operators are applied to any type of energy. In terms of regularization, these operators are the interpolation operators to map the seismic data to a reference common geometry, while in terms of imaging, these are the migration operators.

In one embodiment, a second inter-vintage coupling term for two vintages is used and is defined as follows:

$$E_{12}=\|L_1^H L_1(m_1) - L_2^H L_2(m_1)\|, E_{21}=\|L_2^H L_2(m_2) - L_1^H L_1(m_2)\| \quad (4)$$

This inter-vintage coupling term provides for each of the datasets to give the same mapped model if the mapping and the unmapping operators have been based on any of the two input geometries. Both coupling terms can achieve similar results by removing the operator imprint from the result and harmonizing geometrically induced differences. The choice of which inter-vintage coupling term to use or whether to use both inter-vintage coupling terms depends on the performance of each inter-vintage coupling term and depends on the nature of the datasets and their quality.

All of the equations can be combined into a global cost function where the contributions to the global cost function from each term are set by weighting factors. For the illustrated functions, a global cost function is constructed to combine Equations (2), (3), and (4):

$$E_G = [\alpha_1 E_1 + \alpha_2 E_2] + [\beta_{12} E_{12}^{\pm}] + [\gamma_{12} E_{12} + \gamma_{21} E_{21}] \quad (5)$$

where $\alpha$, $\beta$ and $\gamma$ are weighting factors or control parameters having values that assign the contribution of each equation or each inter-vintage coupling term to the overall global cost function. In one embodiment, $0 \leq \alpha \leq 1$, $0 \leq \beta \leq 1$ and $0 \leq \gamma \leq 1$.

Equation (5) is illustrated for single pair of seismic datasets, i.e., two vintages. However, the cost function can be generalized to a multi-vintage seismic dataset form including all possible combinations of a plurality of seismic datasets or vintages. Equation (6) illustrates this generalized formulation.

$$E_G = \Sigma_{i=1}^n \alpha_i E_i + \Sigma_{j=1}^n \Sigma_{k=1}^n (\beta_{jk} E_{jk}^{\pm} + \gamma_{jk} E_{jk}) \quad (6)$$

Equations (1) through (6) illustrate one embodiment of a set of equations that can be used to map the energies associated with pairs of vintages of seismic data between the geometries associated with those pairs. Mapping the energy from a geometry or location associated with a first vintage to a geometry or location associated with the second energy is not merely the association of the energy with a new geometry but an expression of how that energy would look when associated with that new geometry as opposed to its original geometry.

In addition to being illustrated as an expressed set of mathematical equations, the process for energy mapping can also be explained generally without reference to a specific mathematical implementation. For example, the minimization procedure can be replaced by extracting common parts of the energy between different realizations. Equation (2) states that regularized datasets should be the same as the input data if the unmapping operator is applied. To achieve its action, the input data are regularized to the reference geometry and then de-regularize to the input geometry. Any difference is then considered noise. Equation (2), however, does not couple different surveys or geometries together.

Equation (3) states that the difference and/or the sum of two regularized datasets are the same if it has been unmapped back to any of the two geometries of the original inputs and then mapped back to the reference geometry. Any difference is then considered noise. Equation (4) states that the two regularized datasets should be the same if they have been unmapped back to any of the two geometries of the original inputs, and then mapped back to the reference geometry. Any difference is then considered noise.

The noise models from (a), (b), and (c) can then by directly or adaptively subtracted from results, i.e., the common part is extracted. In one embodiment, this is achieved by any signal processing method. The method generates different realizations of different seismic datasets and their relationships, for example sum and difference. These realizations should have been identical but are not due to geometry induced limitations or mapping operator deficiencies. These differences are measured on the mapping domain, i.e., reference geometry, or the un-mapping domain, i.e., original geometry. The method removes or minimizes these un-desired differences thus producing better results.

Figure 1:
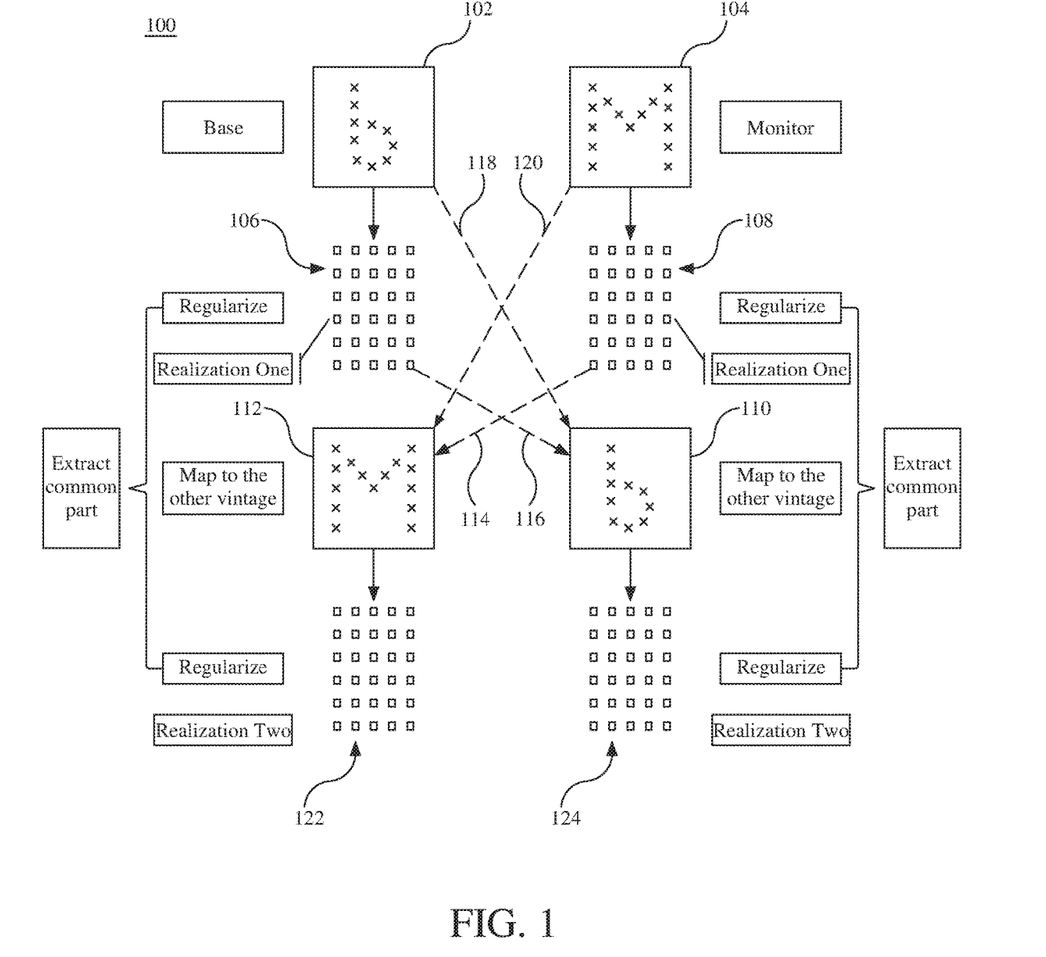
FIG. 1 illustrates inter-vintage coupling of a base seismic survey and a monitor seismic survey.

Referring initially to FIG. 1, the mapping of energies between two seismic dataset vintages 100 is illustrated. The illustration provides a time-lapse regularization setting and includes two seismic dataset vintages, a first seismic dataset obtained from a first or base survey 102 and a second seismic dataset obtained from a second or monitor survey 104. In general, any two seismic datasets obtained at different times can be used. The seismic datasets can be obtained using the same type of seismic survey technique or different types of seismic survey techniques. The base survey includes a plurality of base survey traces, and each base survey trace is associated with a base survey trace location. This defines a base survey geometry. The monitor survey includes a plurality of monitor survey traces, and each monitor survey is associated with a monitor survey trace location. This defines a monitor survey geometry.

In one embodiment, a regularization process is initially applied to both vintages, the base survey and the monitor survey. In one embodiment, the base survey traces are mapped from the base survey geometry to a primary base survey regular grid 106. Similarly, the monitor survey traces are mapped from the monitor survey geometry to a primary monitor survey regular grid 108. In one embodiment, the base survey regular grid and the monitor survey regular grid are a common or identical grid. Alternatively, the base survey regular grid and the monitor survey regular grid are different grids. In one embodiment, mapping to a regular grid is a migration or imaging procedure.

The survey traces mapped to regular grids can then be used to account for changes in acquisition geometries and acquisition parameters between seismic surveys or vintages by solving a cost equation for each vintage separately as illustrated, for example, in equation (2). Improved compensation for geometric changes between vintages is achieved using inter-vintage coupling as provided, for example, in equations (3) and (4).

In inter-vintage coupling, the base survey traces are mapped to the monitor survey geometry 110. This mapping can be conducted directly from the base survey traces in the base survey geometry 118. Alternatively, the base survey traces are mapped from the base survey regular grid 116 to the monitor survey geometry. Similarly, the monitor survey traces are mapped to the base survey geometry 112. This mapping can be conducted directly from the monitor survey traces in the monitor survey geometry 120. Alternatively, the monitor survey traces are mapped from the monitor survey regular grid 114 to the base survey geometry. In one embodiment, mapping from a regular grid to an original survey geometry is a de-migration or modelling procedure.

As used herein, mapping refers to the movement of energy between locations and can be applied to any type of energy. In addition, mapping does not merely move the energy to a new location, but looks at what that what the energy from a first location in a first vintage seismic dataset would look like at a second location in a second vintage seismic dataset. This movement of energy is applied to any type of energy including sonic energy or seismic traces and images. For seismic traces mapping of the energy, an interpolation process is used. Alternatively, mapping is a regularization process.

The base survey traces are then mapped from the monitor survey geometry to a secondary monitor survey regular grid 124. Similarly, the monitor survey traces are mapped from the base survey geometry to a secondary base survey regular grid 122. The primary and secondary regular grids can be the same grids or can be different grids. Following the second mapping to regular grids from the geometries of the other vintage, the seismic datasets lose the uncommon parts of the seismic data, i.e., those parts of the signal that are attributed to changes in geometries and parameters and not to the actual underlying seismic data.

Figure 2:
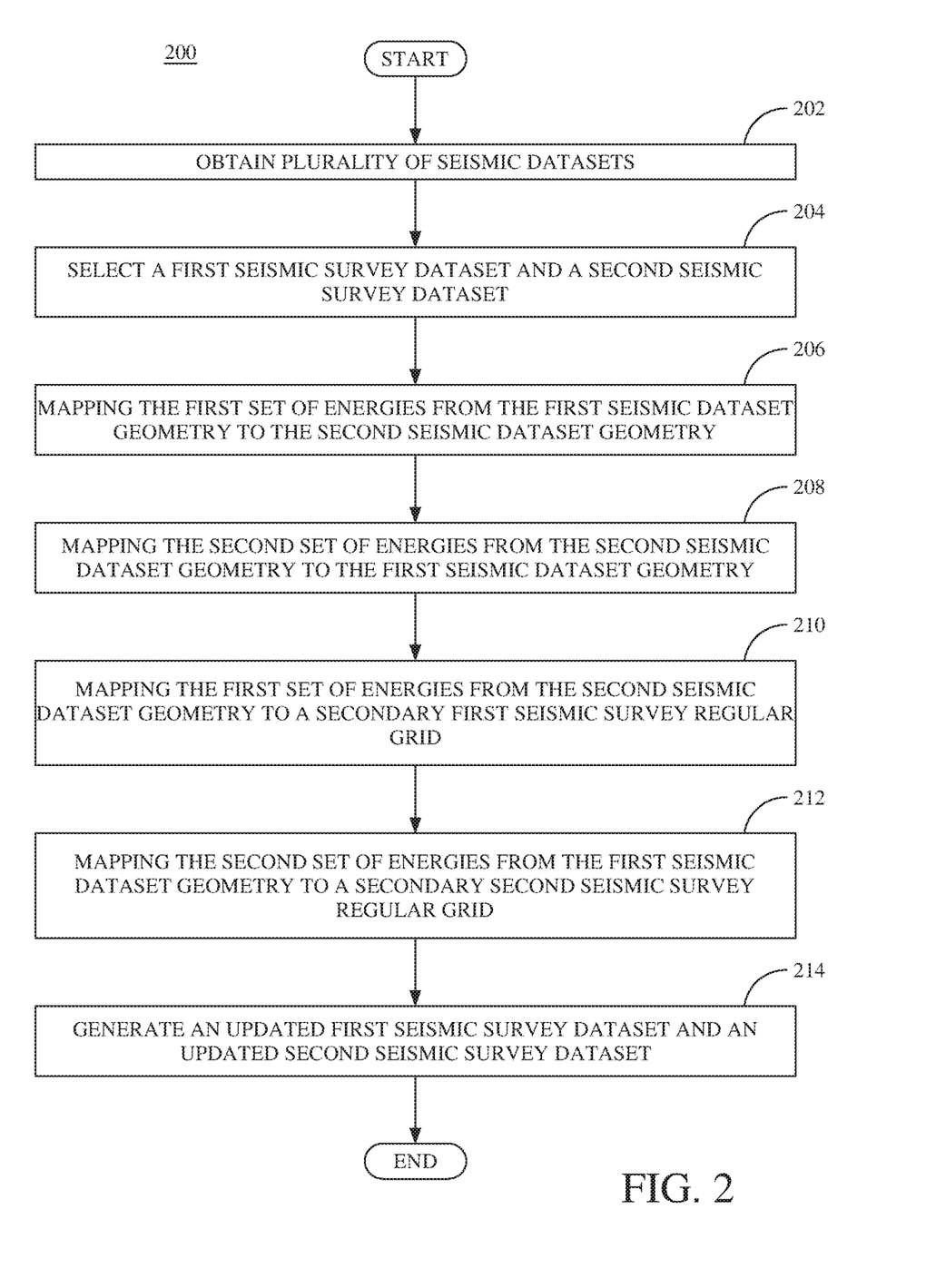
FIG. 2 is a flowchart of an embodiment of a method for multi-vintage energy mapping.

Referring to FIG. 2, a method for multi-vintage energy mapping 200 is illustrated. A plurality of seismic datasets is obtained 202. Each seismic dataset includes a plurality of energies and an acquisition geometry, i.e., a location of the sources and receivers used to obtains the energies. In one embodiment, the energies are seismic traces. Any suitable method for obtaining seismic data can be used to obtain the plurality of seismic datasets. In one embodiment, the each seismic dataset is associated with a distinct seismic survey at a given time and is also referred to as a vintage, e.g., base vintage and monitor vintage.

A first seismic survey dataset and a second seismic survey dataset are selected from the plurality of seismic survey datasets at 204. The first seismic survey dataset includes a set of first energies associated with a first seismic survey geometry, and the second seismic survey dataset includes a set of second energies associated with a second seismic survey geometry. In one embodiment, the first seismic survey and the second seismic survey were obtained at different times, and the physical locations at which energies in the first set of energies and the second set of energies were obtained vary. In one embodiment, the first set of energies are a plurality of first seismic traces, and the second set of energies a plurality of second seismic traces.

In addition to selecting a single pair of seismic survey datasets, a plurality of pairs of first and second seismic survey datasets is selected from the plurality of seismic survey datasets. Therefore, all of the seismic survey datasets are considered in pairs. This plurality of pairs can be considered simultaneously or iteratively. In general, each first seismic survey dataset includes the set of first energies associated with the first seismic survey geometry, and each second seismic survey dataset includes the set of second energies associated with the second seismic survey geometry.

The first set of energies from the first seismic survey geometry to the second seismic survey geometry 206. In addition, the second set of energies from the second seismic survey geometry to the first seismic survey geometry 208. For a plurality of pairs of first and second seismic surveys, the first set of energies from each first seismic survey geometry in a given pair is mapped to the second seismic survey geometry of that given pair, and the second set of energies from each second seismic survey geometry in a given pair is mapped to the first seismic survey geometry of that given pair. When the energies are seismic traces, mapping the first set of energies includes interpolating the plurality of first seismic traces from the first seismic survey geometry to the second seismic survey geometry, and mapping the second set of energies includes interpolating the plurality of second seismic traces from the second seismic survey geometry to the first seismic survey geometry.

While the energies from the first and second seismic survey datasets can be directly mapped across geometries, i.e., inter-vintage coupled, in one embodiment, the energies are first moved to primary regular grids. In one embodiment, the first set of energies are mapped from the first seismic survey geometry to a primary first seismic survey regular grid. In addition, the second set of energies is mapped from the second seismic survey geometry to a primary second seismic survey regular grid. In one embodiment, the primary first seismic survey regular grid and the primary second seismic survey regular grid are the same identical regular grid. The first set of energies are then mapped from the primary first seismic survey regular grid to the second seismic survey geometry, and the second set of energies are mapped from the primary second seismic survey regular grid to the first seismic survey geometry.

In general, the inter-vintage coupling, i.e., the cross mapping of energies between geometries facilitates the removal of the uncommon parts of the changes in energy, i.e., the parts dues to changes in geometry and maintains just the energies associated with the changes of interest overtime in the subsurface. In one embodiment, the first set of energies is mapped from the second seismic survey geometry to a secondary first seismic survey regular grid 210, and the second set of energies is mapped from the first seismic survey geometry to a secondary second seismic survey regular grid 212. In one embodiment, the secondary first seismic survey regular grid and the secondary second seismic survey regular grid are the same identical regular grid.

An updated first seismic survey dataset and an updated second seismic survey dataset are generated 214. Only energies from the first and second seismic survey datasets associated with changes in a subsurface are preserved in the updated first and second seismic survey datasets. When a plurality of pairs of seismic survey datasets are selected, an updated first seismic dataset and an updated second seismic dataset are generated for each pair. Therefore, an improved image of the subsurface is generated using multi-vintage seismic data in which changes in the seismic dataset set attributable to variances in the acquisition geometry are eliminated and actual subsurface changes are maintained. This represents an improvement in the modeling of subsurface elements including reservoirs and in particular provides an improved view of changes in the reservoir over time that result from production from those reservoirs.

Figure 3:
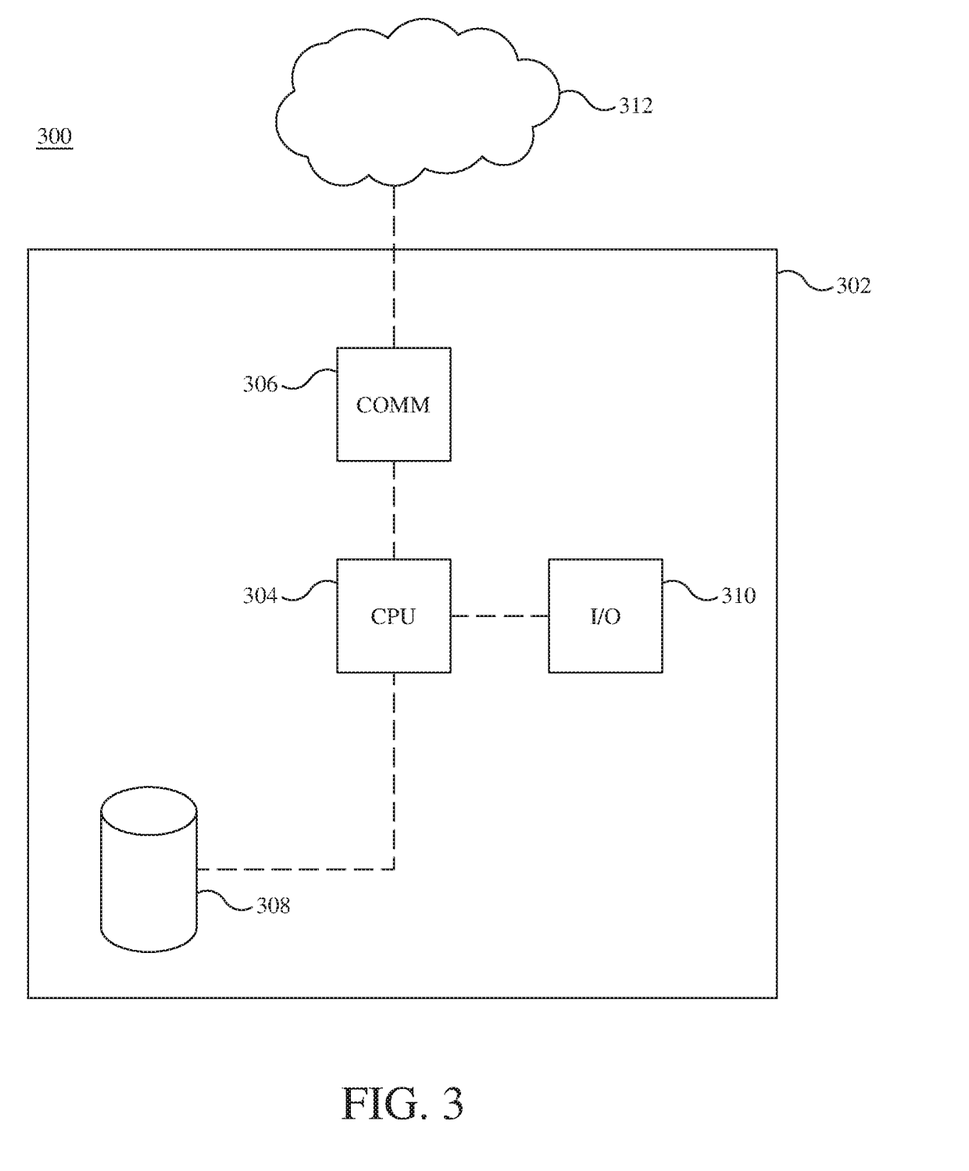
FIG. 3 is a schematic representation of an embodiment of a computing system for use in executing a method for inversion of multi-vintage seismic data.

Referring to FIG. 3, exemplary embodiments are directed to a computing system 300 for performing a method multi-vintage energy mapping. In one embodiment, a computing device for performing the calculations as set forth in the above-described embodiments may be any type of computing device capable of obtaining, processing and communicating multi-vintage seismic data associated with seismic surveys conducted at different time periods. The computing system 300 includes a computer or server 302 having one or more central processing units 304 in communication with a communication module 306, one or more input/output devices 310 and at least one storage device 308.

The communication module is used to obtain seismic datasets of a subsurface structure for a plurality of vintages. The obtain plurality of seismic datasets can be obtained, for example, through the input/output devices. The obtained plurality of seismic datasets is stored in the storage device. In addition, the storage device is used to store initial and updated seismic survey datasets as well as the computer executable code that is used to execute the methods for simultaneous inversion of multi-vintage seismic data. The input/output device can also be used to communicate or display outputs and updated seismic survey datasets, for example, to a user of the computing system.

The processor is in communication with the communication module and configured to select a first seismic survey dataset and a second seismic survey dataset from the plurality of seismic survey datasets. The first seismic survey dataset includes a set of first energies associated with a first seismic survey geometry, and the second seismic survey dataset includes a set of second energies associated with a second seismic survey geometry.

The processor is further configured to map the first set of energies from the first seismic survey geometry to the second seismic survey geometry, to map the second set of energies from the second seismic survey geometry to the first seismic survey geometry and to generate an updated first seismic dataset and an updated second seismic dataset. Only energies from the first and second seismic datasets associated with changes in a subsurface are preserved in the updated first and second seismic datasets. In general, the central processor is configured to perform any of the steps of the methods described herein.

Suitable embodiments for the various components of the computing system are known to those of ordinary skill in the art, and this description includes all known and future variants of these types of devices. The communication module provides for communication with other computing systems, databases and data acquisition systems across one or more local or wide area networks 312. This includes both wired and wireless communication. Suitable input/output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 300 can be used to implement the methods described above associated with performing a method multi-vintage energy mapping. Hardware, firmware, software or a combination thereof may be used to perform the various steps and operations described herein.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for multi-vintage energy mapping in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

The disclosed exemplary embodiments provide a computing device, software and method for method for inversion of multi-vintage seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for multi-vintage energy mapping to observe evolution of a subsurface, the method comprising:
selecting a first seismic survey dataset and a second seismic survey dataset from a plurality of seismic survey datasets acquired over the subsurface, the first seismic survey dataset comprising a set of first energies associated with a first seismic survey geometry and the second seismic survey dataset comprising a set of second energies associated with a second seismic survey geometry;

mapping the first set of energies from the first seismic survey geometry to the second seismic survey geometry;

mapping the second set of energies from the second seismic geometry to the first seismic survey geometry; and generating an updated first seismic survey dataset by extracting a first common part of the second set of energies and the first set of energies mapped at the second seismic survey geometry, and an updated second seismic survey dataset by extracting a second common part of the second set of energies mapped at the first seismic survey geometry so that energies associated with changes in the subsurface occurring between acquiring the first dataset and acquiring the second dataset are preserved in the updated first and second seismic survey datasets to enable observing evolution of the subsurface.

2. The method of claim 1, wherein:
the first seismic survey dataset and the second seismic survey dataset were obtained at different times; and
physical locations at which energies in the first set of energies and the second set of energies were obtained vary.

3. The method of claim 1, wherein:
the first seismic survey dataset and the second seismic survey dataset pertain to a pair among a plurality of pairs of first and second seismic survey datasets selected from the plurality of seismic survey datasets, each first seismic survey dataset in each pair comprising the set of first energies associated with the first seismic survey geometry and each second seismic survey dataset in the pair comprising the set of second energies associated with the second seismic survey geometry;
mapping the first set of energies comprises mapping the first set of energies from each first seismic survey geometry in a given pair to the second seismic survey geometry of that given pair;
mapping the second set of energies comprises mapping the second set of energies from each second seismic survey geometry in a given pair to the first seismic survey geometry of that given pair; and
generating the updated first seismic survey dataset and the updated second seismic survey dataset comprises generating the updated first seismic survey dataset and the updated second seismic survey dataset for each pair.

4. The method of claim 1, wherein:
the first set of energies comprises a plurality of first seismic traces; and
the second set of energies comprises a plurality of second seismic traces.

5. The method of claim 4, wherein:
mapping the first set of energies comprises interpolating the plurality of first seismic traces from the first seismic survey geometry to the second seismic survey geometry; and
mapping the second set of energies comprises interpolating the plurality of second seismic traces from the second seismic survey geometry to the first seismic survey geometry.

6. The method of claim 1, wherein the method further comprises:

mapping the first set of energies from the second seismic survey geometry to a secondary first seismic survey grid; and mapping the second set of energies from the first seismic survey geometry to a secondary second seismic survey grid.

7. The method of claim 6, wherein the secondary first seismic survey grid and the secondary second seismic survey grid comprise an identical grid.

8. The method of claim 1, wherein:
mapping the first set of energies from the first seismic survey geometry to the second seismic survey geometry further comprises mapping the first set of energies from the first seismic survey geometry to a primary first seismic survey grid; and
mapping the second set of energies from the second seismic survey geometry to the first seismic survey geometry further comprises mapping the second set of energies from the second seismic survey geometry to a primary second seismic survey grid.

9. The method of claim 8, wherein the primary first seismic survey grid and the primary second seismic survey grid comprise an identical grid.

10. The method of claim 8, wherein:
mapping the first set of energies from the first seismic survey geometry to the second seismic survey geometry further comprises mapping the first set of energies from the primary first seismic survey grid to the second seismic survey geometry; and
mapping the second set of energies from the second seismic survey geometry to the first seismic survey geometry further comprises mapping the second set of energies from the primary second seismic survey grid to the first seismic survey geometry.

11. A non-transitory computer-readable medium containing computer-executable code that when read by a computer causes the computer to perform a method for multi-vintage energy mapping to observe evolution of a subsurface, the method comprising:
selecting a first seismic survey dataset and a second seismic survey dataset from a plurality of seismic survey datasets acquired over the subsurface, the first seismic survey dataset comprising a set of first energies associated with a first seismic survey geometry and the second seismic survey dataset comprising a set of second energies associated with a second seismic survey geometry;
mapping the first set of energies from the first seismic survey geometry to the second seismic survey geometry;
mapping the second set of energies from the second seismic geometry to the first seismic survey geometry; and
generating an updated first seismic survey dataset by extracting a first common part of the second set of energies and the first set of energies mapped at the second seismic survey geometry, and an updated second seismic survey dataset by extracting a second common part of the second set of energies mapped at the first seismic survey geometry so that energies associated with changes in the subsurface occurring between acquiring the first dataset and acquiring the second dataset are preserved in the updated first and second seismic survey datasets to enable observing evolution of the subsurface.

12. The non-transitory computer-readable medium of claim 11, wherein:

the first seismic survey and the second seismic survey were obtained at different times; and physical locations at which energies in the first set of energies and the second set of energies were obtained vary.

13. The non-transitory computer-readable medium of claim 11, wherein:

the first seismic survey dataset and the second seismic survey dataset pertain to a pair among a plurality of pairs of first and second seismic survey datasets selected from the plurality of seismic survey datasets, each first seismic survey dataset of each pair comprising the set of first energies associated with the first seismic survey geometry and each second seismic survey dataset of the pair comprising the set of second energies associated with the second seismic survey geometry;

mapping the first set of energies comprises mapping the first set of energies from each first seismic survey geometry in a given pair to the second seismic survey geometry of that given pair;

mapping the second set of energies comprises mapping the second set of energies from each second seismic survey geometry in a given pair to the first seismic survey geometry of that given pair; and generating the updated first seismic survey dataset and the updated second seismic survey dataset comprises generating the updated first seismic survey dataset and the updated second seismic survey dataset for each pair.

14. The non-transitory computer-readable medium of claim 11, wherein: the first set of energies comprises a plurality of first seismic traces; and the second set of energies comprises a plurality of second seismic traces.

15. The non-transitory computer-readable medium of claim 14, wherein:

mapping the first set of energies comprises interpolating the plurality of first seismic traces from the first seismic survey geometry to the second seismic survey geometry; and mapping the second set of energies comprises interpolating the plurality of second seismic traces from the second seismic survey geometry to the first seismic survey geometry.

16. The non-transitory computer-readable medium of claim 11, wherein the method further comprises:

mapping the first set of energies from the second seismic survey geometry to a secondary first seismic survey grid; and mapping the second set of energies from the first seismic survey geometry to a secondary second seismic survey grid.

17. The non-transitory computer-readable medium of claim 16, wherein the secondary first seismic survey grid and the secondary second seismic survey grid comprise an identical grid.

18. The non-transitory computer-readable medium of claim 11, wherein:

mapping the first set of energies from the first seismic survey geometry to the second seismic survey geometry further comprises: mapping the first set of energies from the first seismic survey geometry to a primary first seismic survey grid; and mapping the first set of energies from the primary first seismic survey grid to the second seismic survey geometry; and mapping the second set of energies from the second seismic survey geometry to the first seismic survey geometry further comprises:

mapping the second set of energies from the second seismic survey geometry to a primary second seismic survey grid; and mapping the second set of energies from the primary second seismic survey grid to the first seismic survey geometry.

19. The non-transitory computer-readable medium of claim 18, wherein the primary first seismic survey grid and the primary second seismic survey grid comprise an identical grid.

20. A computing system for performing a method multi-vintage energy mapping to observe evolution of a subsurface, the computing system comprising:

a storage device comprising a plurality of seismic survey datasets acquired over the subsurface; and a processor in communication with the storage device and configured to:

select a first seismic survey dataset and a second seismic survey dataset from the plurality of seismic survey datasets, the first seismic survey dataset comprising a set of first energies associated with a first seismic survey geometry and the second seismic survey dataset comprising a set of second energies associated with a second seismic survey geometry;

map the first set of energies from the first seismic survey geometry to the second seismic survey geometry;

map the second set of energies from the second seismic survey geometry to the first seismic survey geometry; and generate an updated first seismic dataset by extracting a first common part of the second set of energies and the first set of energies mapped at the second seismic survey geometry, and an updated second seismic dataset extracting a second common part of the second set of energies mapped at the first seismic survey geometry so that energies associated with changes in the subsurface occurring between acquiring the first dataset and acquiring the second dataset are preserved in the updated first and second seismic datasets to enable observing evolution of the subsurface.

* * * * *